United States Patent
Jaaskelainen et al.

(10) Patent No.: US 10,309,830 B2
(45) Date of Patent: Jun. 4, 2019

(54) METHODS TO CORRECT SPECTRUM DISTORTION OF FFPI SENSORS INDUCED BY DYNAMIC WAVELENGTH DEPENDENT ATTENUATION

(71) Applicant: Halliburton Energy Services, Inc, Houston, TX (US)

(72) Inventors: Mikko Jaaskelainen, Katy, TX (US); Yunmiao Wang, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 76 days.

(21) Appl. No.: 15/524,379

(22) PCT Filed: Dec. 23, 2014

(86) PCT No.: PCT/US2014/072074
§ 371 (c)(1),
(2) Date: May 4, 2017

(87) PCT Pub. No.: WO2016/105373
PCT Pub. Date: Jun. 30, 2016

(65) Prior Publication Data
US 2018/0283942 A1    Oct. 4, 2018

(51) Int. Cl.
*G01N 21/00* (2006.01)
*G01J 3/02* (2006.01)
(Continued)

(52) U.S. Cl.
CPC ........ *G01J 3/0218* (2013.01); *G01D 5/35312* (2013.01); *G01J 3/26* (2013.01);
(Continued)

(58) Field of Classification Search
CPC ........... G01M 11/3145; G01M 11/335; G01M 11/33; G01M 11/3109; G01M 11/338
(Continued)

(56) References Cited

U.S. PATENT DOCUMENTS

| 5,392,117 A | 2/1995 | Belleville et al. |
| 6,173,091 B1 | 1/2001 | Reich |

(Continued)

FOREIGN PATENT DOCUMENTS

| CN | 101509789 A | 8/2009 |
| EP | 2104842 B1 | 9/2011 |

(Continued)

OTHER PUBLICATIONS

Kuwazuru, Estimation of Long-Term Transmission Loss Increase in Silica-Based Optical Fibers under Hydrogen Atmosphere Journal of Lightwave Technology, vol. 6, No. 2, Feb. 1988.
(Continued)

Primary Examiner — Md M Rahman
(74) Attorney, Agent, or Firm — Gilliam IP PLLC (57) ABSTRACT

Methods are proposed for compensation of distortion in fiber Fabry-Perot interferometric (FFPI) sensors induced by dynamic wavelength dependent attenuation in subsurface wells. The methods involve measurement techniques that correct the reflective spectrum from one or more FFPI sensors utilizing a background low frequency spectrum for normalization.

9 Claims, 10 Drawing Sheets

(51) Int. Cl.
*G01J 3/26* (2006.01)
*G01J 3/28* (2006.01)
*G01J 3/42* (2006.01)
*G01K 11/32* (2006.01)
*G01L 1/24* (2006.01)
*G01D 5/353* (2006.01)

(52) U.S. Cl.
CPC . *G01J 3/28* (2013.01); *G01J 3/42* (2013.01); *G01K 11/32* (2013.01); *G01L 1/24* (2013.01)

(58) Field of Classification Search
USPC ........................................................ 356/73.1
See application file for complete search history.

(56) References Cited

U.S. PATENT DOCUMENTS

| | | | |
|---|---|---|---|
| 6,281,976 | B1 | 8/2001 | Taylor et al. |
| 6,343,173 | B2 | 1/2002 | Hordvik et al. |
| 7,548,681 | B2 | 6/2009 | Rubinstein et al. |
| 7,564,562 | B2 | 7/2009 | Choi |
| 7,646,953 | B2 | 1/2010 | Dowd et al. |
| 7,762,720 | B1 * | 7/2010 | Zhu ........................ G01J 5/08 374/121 |
| 8,401,355 | B2 | 3/2013 | Homa et al. |
| 8,414,186 | B2 | 4/2013 | Lee et al. |
| 8,496,376 | B2 | 7/2013 | Lee et al. |
| 2003/0094281 | A1 * | 5/2003 | Tubel ...................... E21B 47/00 166/250.03 |
| 2005/0046850 | A1 * | 3/2005 | Chow ................ G01B 11/0625 356/430 |
| 2005/0046862 | A1 | 3/2005 | Melnyk |
| 2005/0099618 | A1 | 5/2005 | DiFoggio et al. |
| 2005/0231728 | A1 * | 10/2005 | Wang ................. G01B 9/02007 356/480 |
| 2008/0084565 | A1 * | 4/2008 | Zribi ...................... G01D 5/268 356/481 |
| 2009/0103081 | A1 * | 4/2009 | Whelan .................... G01J 3/28 356/243.1 |
| 2012/0210797 | A1 * | 8/2012 | Yu .......................... G01L 9/0079 73/705 |

FOREIGN PATENT DOCUMENTS

| | | |
|---|---|---|
| WO | 2013166407 A1 | 11/2013 |
| WO | 2014179073 A1 | 11/2014 |

OTHER PUBLICATIONS

Ma, Signal processing of white-light interferometric low-finesse fiber-optic Fabry-Perot sensors Applied Optics, Jan. 10, 2013 / vol. 52, No. 2.

Han, Signal-processing algorithm for white-light optical fiber extrinsic Fabry-Perot interferometric sensors Optics Letters / vol. 29, No. 15 / Aug. 1, 2004.

* cited by examiner

METHODS TO CORRECT SPECTRUM DISTORTION OF FFPI SENSORS INDUCED BY DYNAMIC WAVELENGTH DEPENDENT ATTENUATION

BACKGROUND

This disclosure relates methods to compensate dynamic wavelength dependent attenuation induced signal distortion of fiber Fabry-Perot interferometric (FFPI) sensors. More particularly, it relates to using signal processing methods to calculate dynamic wavelength dependent attenuation and further compensate the signal of FFPI sensors. There are several mechanisms that can cause dynamic wavelength dependent attenuation on fibers such as hydrogen darkening, macro bending, water absorption and so on. In this disclosure, hydrogen darkening induced attenuation is used as an example to demonstrate the invented methods.

Fiber optic sensors are attractive for harsh environment applications due to their distinguished advantages including good high-temperature capability, corrosion resistance and electromagnetic insensitivity. Nowadays oil and gas application has increasingly adopted fiber optic sensors to monitor producing zones and take actions to optimize production. Fiber cables with a length from 1 km to 10 km are deployed in wells. These fiber cables can be sensing elements themselves for some applications like distributed temperature sensing (DTS), distributed acoustic sensing (DAS) and distributed stain sensing (DSS) or serve as waveguide to transmit the signal of some point sensors such as Fiber Bragg grating (FBG) based sensors and FFPI based sensors. It is known that hydrogen diffusion into optical fibers results in the attenuation of the light being transmitted, which is pervasive in oil and gas well environment. This attenuation degrades the sensing performance, so a lot effort has been taken to mitigate the hydrogen darkening by adjusting the dopants in fibers [1,2] and optimizing the cables designs [3-5]. However all these methods only mitigate the hydrogen darkening but cannot intrinsically exclude the attenuation, especially for long deployment length (up to 10 km) and/or high temperature (up to 300 C) applications. As a result, it is necessary to compensate the hydrogen darkening in the interrogation system. For example, dual-laser interrogation systems are used to compensate for hydrogen darkening in DTS applications.

There is a need then to compensate for the spectral distortion that occurs in Fiber Fabry-Perot sensing systems due to hydrogen darkening.

DETAILED DESCRIPTION

In the following detailed description, reference is made to accompanying drawings that illustrate embodiments of the present disclosure. These embodiments are described in sufficient detail to enable a person of ordinary skill in the art to practice the disclosure without undue experimentation. It should be understood, however, that the embodiments and examples described herein are given by way of illustration only, and not by way of limitation. Various substitutions, modifications, additions, and rearrangements may be made without departing from the spirit of the present disclosure. Therefore, the description that follows is not to be taken in a limited sense, and the scope of the present disclosure will be defined only by the final claims.

Many Fiber-Optic Fabry-Perot Interferometer (FFPI) sensors have been proposed to measure variables such as temperature, pressure, strain and acoustic signals. In general, an FFPI sensor consists of two reflective surfaces and the reflective light from these two surfaces interfere with each other. The interference signal is being guided by a fiber and monitored to demodulate the cavity change, which corresponds to the environmental change.

Figure 1:
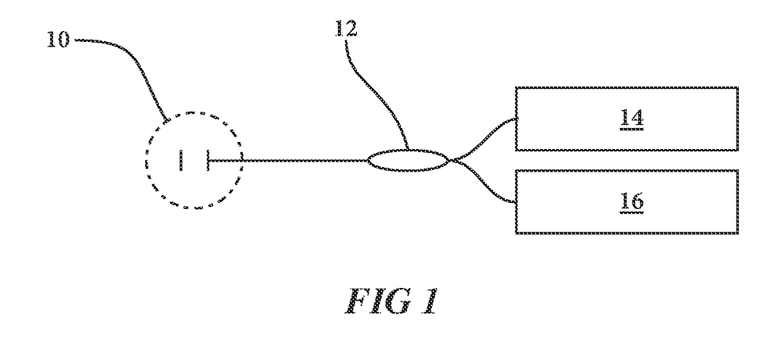
FIG. 1 illustrates an FFPI sensor interrogation system.

FIG. 1 illustrates a typical FFPI sensor interrogation system, which includes a Fabry-Perot sensor 10 including a light source 14, a coupler 12 and a spectrometer 16. The light source 14 is fed through coupler 12 through a fiber optic cable into a region of interest in a subsurface well and is fed to one or more FFPI sensors 10. The reflective spectrum from the sensors then returns via coupler 12 and to spectrometer 16 for analysis.

The light source may be a white light source or a swept laser and this disclosure anticipates either could be used.

Figure 2:
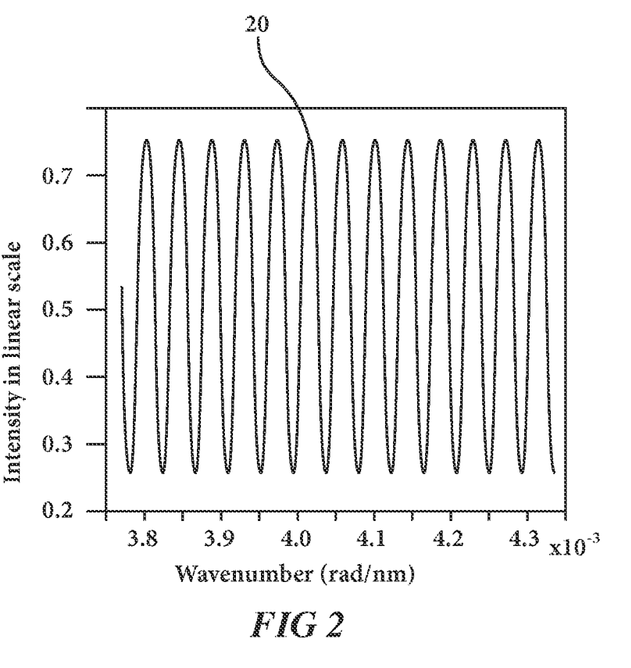
FIG. 2 illustrates the reflective spectrum of an FFPI sensor.

FIG. 2 illustrates a typical reflective spectrum 20 of an FFPI sensor in wavenumber domain without distortion induced by dynamic wavelength dependent attenuation.

The electric field of the reflective light can be expressed as $$E = E_1 + E_2 = \eta_1 R_1 E_0 + \eta_2 R_2 E_0 \exp(j(kL+\phi)) \quad (1)$$

where $E_0$ is the electric field of the incident light, $R_1$ and $R_2$ are the reflective coefficients at two surfaces, k is the wavenumber, L is the optical path difference between the two reflective surfaces, $\eta_1$ and $\eta_2$ are the coefficients of coupling efficiency of the light reflected into the guided fiber and $\phi$ is the initial phase. The intensity of the reflected light can be given as $$I(k) = |E|^2 = |E_0|^2 [\eta_1^2 R_1^2 + \eta_2^2 R_2^2 + 2\eta_1\eta_2 R_1 R_2 \cos(kL+\phi)] = I_0[A + B\cos(kL+\phi)] \quad (2)$$

where $I_0$ is the intensity of the incident light. A and B are two constants and given as $$A = \eta_1^2 R_1^2 + \eta_2^2 R_2^2 \quad (3)$$

$$B = 2\eta_1\eta_2 R_1 R_2 \quad (4)$$

When an FFPI sensor is deployed in a well with several kilometer fibers, the attenuation induced by hydrogen should be considered. Assuming $\alpha(k,t)$ is the round-trip attenuation coefficient because of hydrogen in wavenumber domain, the intensity of the reflected light becomes $$I(k,t) = I_0 \alpha(k,t)[A + B\cos(kL+\phi)] \quad (5)$$

Figure 3:
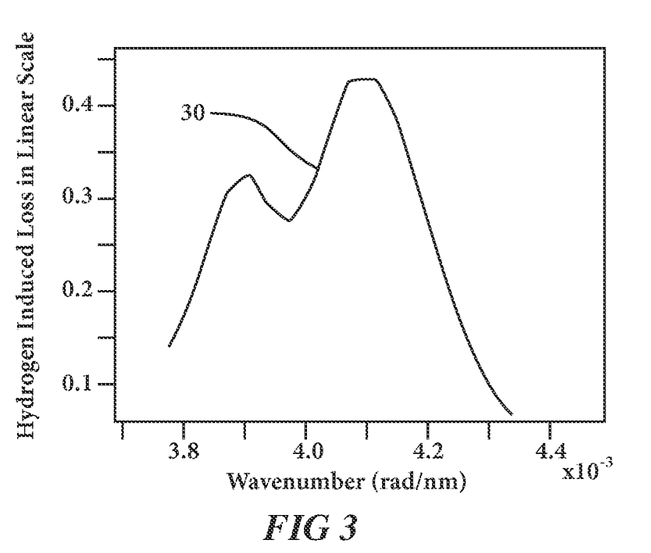
FIG. 3 illustrates an example induced transmission loss of a fiber.
Figure 4:
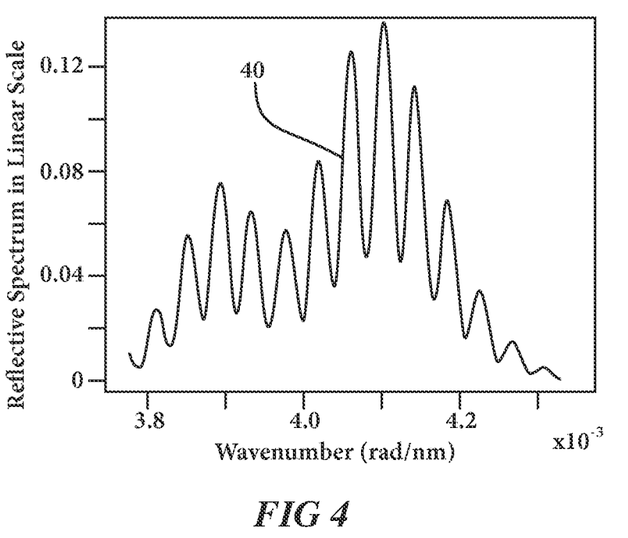
FIG. 4 illustrates the distorted reflective spectrum of an FFPI sensor with attenuation induced by hydrogen.

The attenuation coefficient $\alpha(k,t)$ is a dynamic variable and is proportional to the molecular concentration of hydrogen in the silica fiber, temperature, fiber length and deployment time. The attenuation is also wavelength dependent. FIG. 3 shows the hydrogen induced transmission loss 30 of the fiber prepared as described by Kuwazuru, et al. [Journal of Lightwave Technology, Vol. 6, No. 2, February 1988), and it is displayed in wavenumber domain corresponding to wavelength range from 1450 nm to 1660 nm. The spectrum of an FFPI sensor such as the one shown in FIG. 2 can be distorted by changes in back ground fiber attenuation because of hydrogen. FIG. 4 shows the spectrum 40 of the same FFPI sensor given in FIG. 2 but with the attenuation described in FIG. 3 applied to it. Since the attenuation changes dynamically with the change of environment, the distorted reflective spectrum changes accordingly. Many published FFPI sensor demodulation methods cannot be applied due to this dynamic distortion. The two methods to be described in this disclosure dynamically calculate the hydrogen induced attenuation and further compensate the spectrum of FFPI sensor.

Embodiment 1

In one embodiment a method can be developed as follows. Based on equation 5, the intensity of the reflected light can be expressed as $$I(k,t) = I_0\alpha(k,t)[A + B\cos(kL+\phi)] = I_1 + I_2 = I_0 A\alpha(k,t) + I_0 B\alpha(k,t)\cos(kL+\phi) \quad (6)$$

Figure 5:
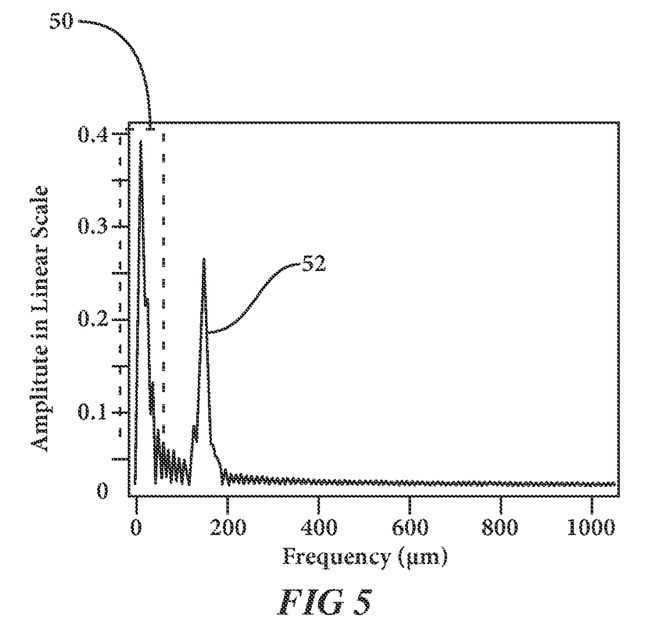
FIG. 5 illustrates a Fourier-transformation of the distorted reflective spectrum of an FFPI sensor.
Figure 6:
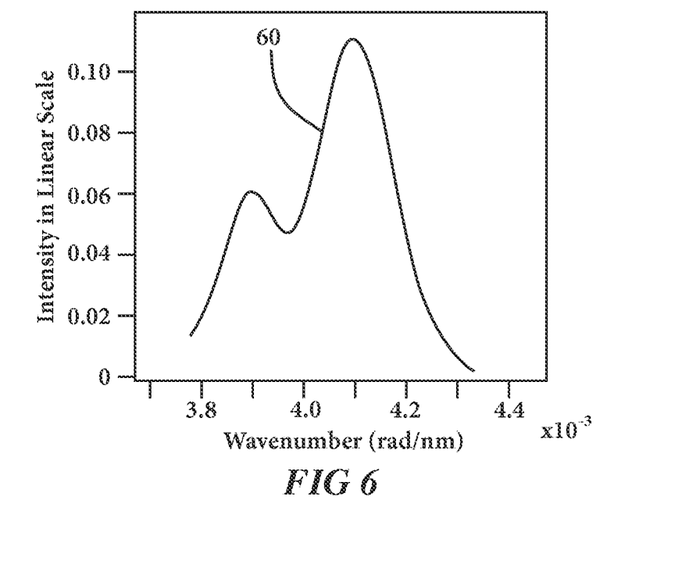
FIG. 6 illustrates the signal of FIG. 3 after passing through a low-pass filter.

Since the attenuation $\alpha(k,t)$ changes slowly with wavenumber, the spectrum can be considered to contain a background signal $I_1 = I_0 A\alpha(k,t)$ and an amplitude-modulated (AM) signal $I_2 = I_0 B\alpha(k,t)\cos(kL+\phi)$ with a carrier of frequency L in the wavenumber domain. FIG. 5 shows the discrete Fourier-transformation result of the spectrum described in equation (6), which is also given in FIG. 4. The background signal $I_1$ falls into the low-frequency region 50 with a spectral range S. The AM signal $I_2$, shifts the spectrum of $I_0 B\alpha(k,t)$ to frequency 52, designated as L. If L is selected to be L>2S during the sensor fabrication, the spectra of $I_1$ and $I_2$ will not overlap. A lowpass filter can then be used to select the background signal $I_1$. The lowpass filter should be carefully designed to ensure no distortion is introduced to the signal. After filtering with this filter, the analytical signal can be written as $$I_1'(k,t) = I_0 A'\alpha(k,t) \quad (7)$$

where A' is the amplitude coefficient after filtering. FIG. 6 shows the result after a lowpass filter is applied on the distorted spectrum. Assuming the power fluctuation of the light source is negligible compared with the attenuation change, the filtered signal $I_1'(k,t)$ changes with the change of attenuation $\alpha(k,t)$. Before the fiber cable is deployed in the well, there is no attenuation induced by hydrogen $\alpha_{t=0}(k)=1$. The filtered signal at t=0 can be used as a reference, the dynamic hydrogen induced attenuation can be calculated as $$\alpha(k,t) = \frac{I_1'(t,k)}{I_1'(t=0,k)} = \frac{I_0 A'\alpha(k,t)}{I_0 A'} \quad (8)$$

Dividing the filtered signal can normalize the distorted spectrum:

$$I_{nor}(k,t) = \frac{I(k,t)}{I_1'(k,t)} = \frac{A}{A'} + \frac{B}{A'}\cos(kL+\phi) \quad (9)$$

Figure 7:
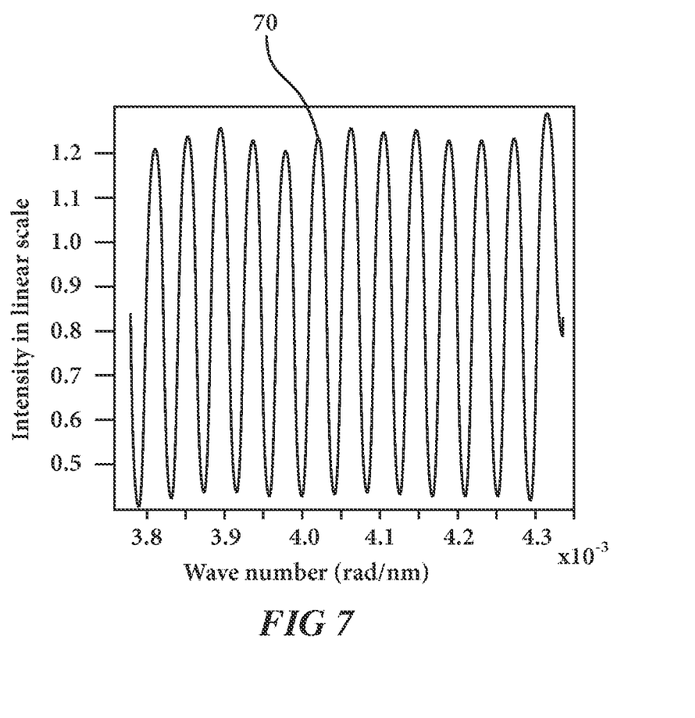
FIG. 7 illustrates a normalized spectrum of FIG. 4.

After the normalization, the distortion induced by the attenuation $\alpha(k,t)$ is compensated out. The developed FFPI demodulation methods can be used to calculate the cavity length. FIG. 7 shows the normalized spectrum 70 of an FFPI sensor based on this first method despite the severe hydrogen induced transmission loss exhibited earlier in FIG. 3.

By comparing the filtered reflective spectrum acquired before and after installation of the one or more FFPI sensors the wavelength dependent loss of the cable can be estimated.

Embodiment 2

Based on equation 5, the peak locations of the spectrum in wavenumber domain meet $$I(k_{pi},t) = I_0\alpha(k_{pi},t)[A+B], i=1\ldots N \quad (10)$$

The valley locations of the spectrum in the wavenumber domain meet $$I(k_{vj},t) = I_0\alpha(k_{vj},t)[A-B], j=1\ldots M \quad (11)$$

Where i is the index of peak, N is the total number of peaks in the spectrum, j is the index of valley, M is the total number of valleys in the spectrum. With proper interpolation on the peak locations, we can obtain $$I_p(k,t) = I_0\alpha(k,t)(A+B), k_{1p} < k < k_{pN} \quad (12)$$

With proper interpolation on the valley locations, we can obtain $$I_v(k,t) = I_0\alpha(k,t)(A-B), k_{1v} < k < k_{vM} \quad (13)$$

Figure 8:
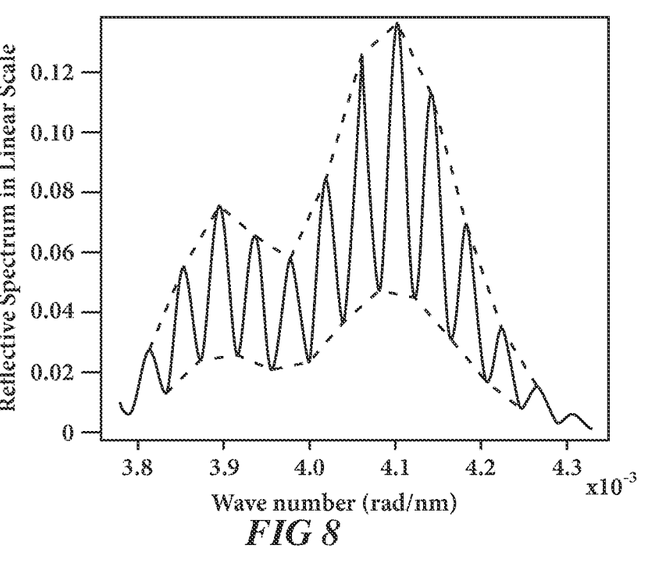
FIG. 8 illustrates the interpolated curves from an embodiment of this disclosure.

FIG. 8 shows the interpolated curves $I_p(k,t)$ and $I_p(k,t)$. Based on equation (12) and (13), we can obtain $$I_1(k,t) = \frac{I_p(k,t) + I_v(k,t)}{2} = I_0 A\alpha(k,t), \quad (14)$$

$$\max(k_{1p}, k_{1v}) < k < \min(k_{pN}, k_{vM})^2$$

Figure 9:
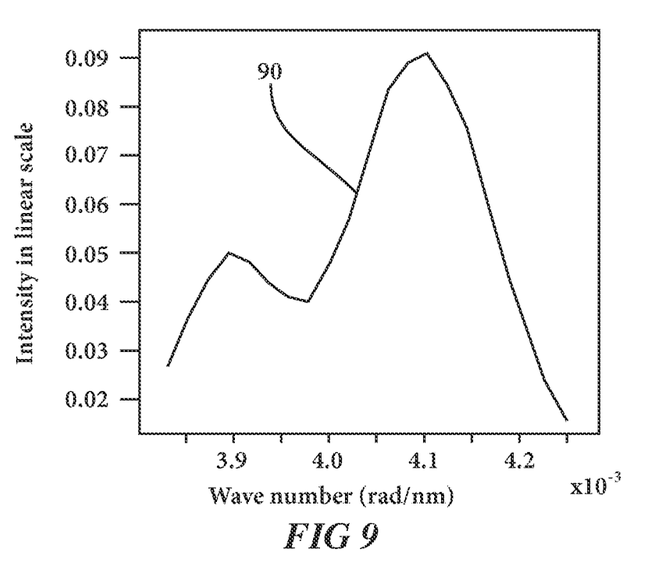
FIG. 9 illustrates a calculated background signal from an embodiment of this disclosure.

This is the background signal as described in equation (6). FIG. 9 shows the calculated background signal $I_1(k,t)$ 90. The wavenumber range of this calculated background signal is narrower than the original spectrum, which is determined by the first peak/valley locations and last peak/valley locations. Curve-fitting and other signal processing techniques can then be used to smooth the interpolated curves $I_p(k,t)$ and $I_v(k,t)$ and further to increase the calculation accuracy of background signal $I_1(k,t)$.

Assuming the power fluctuation of the light source is negligible compared with the attenuation change, the background signal $I_1(k,t)$ changes with the change of attenuation $\alpha(k,t)$. Before the fiber cable is deployed in the well, there is no attenuation induced by hydrogen $\alpha_{t=0}(k)=1$. The background signal at t=0 can be used as a reference, the dynamic hydrogen induced attenuation can be calculated as $$\alpha(k,t) = \frac{I_1(t,k)}{I_1(t=0,k)} = \frac{I_0 A\alpha(k,t)}{I_0 A}, \max(k_{1p}, k_{1v}) < k < \min(k_{pN}, k_{vM}) \quad (15)$$

The distorted spectrum can be normalized by dividing the background signal:

$$I_{nor}(k,t) = \frac{I(k,t)}{I_1(k,t)} = 1 + \frac{B}{A}\cos(kL+\phi), \quad (16)$$

$$\max(k_{1p}, k_{1v}) < k < \min(k_{pN}, k_{vM})$$

Figure 10:
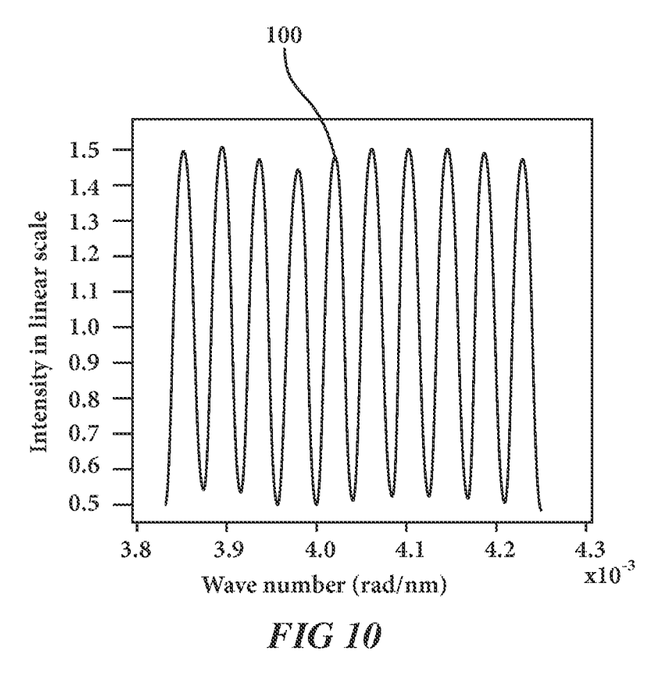
FIG. 10 illustrates the normalized spectrum of an FFPI sensor.

After the normalization, the distortion induced by the attenuation $\alpha(k,t)$ is compensated out. The developed FFPI demodulation methods can be used to calculate the cavity length. FIG. 10 shows the normalized spectrum 100 of an EFPI sensor. However the normalized spectrum has a narrower wavenumber range than the original spectrum, which is limited by the first peak/valley locations and last peak/valley locations.

With above two embodiments, we can compensate the spectrum distortion of FFPI sensors caused by the attenuation induced by hydrogen. At the same time, it provides solutions to dynamically monitor the attenuation induced by hydrogen, which can be used to compensate other fiber optics sensors deployed in the same well.

Although certain embodiments and their advantages have been described herein in detail, it should be understood that various changes, substitutions and alterations could be made without departing from the coverage as defined by the appended claims. Moreover, the potential applications of the disclosed techniques is not intended to be limited to the particular embodiments of the processes, machines, manufactures, means, methods and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized. Accordingly, the appended claims are intended to include within their scope such processes, machines, manufactures, means, methods or steps.

The invention claimed is:

1. A method for compensation of distortion in fiber Fabry-Perot interferometric (FFPI) sensors induced by dynamic wavelength dependent attenuation in subsurface wells, said method comprising:
   a. installing one or more FFPI sensors into a region of interest in a subsurface well;
   b. feeding a light source through a fiber optic cable into the one or more FFPI sensors;
   c. returning an original reflective spectrum from the one or more FFPI sensors to a spectrometer for analysis;
   d. filtering the original reflective spectrum from the one or more FFPI sensors through a low-pass filter to generate an original filtered reflective spectrum;
   e. dividing the original filtered reflective spectrum by a filtered reflected spectrum obtained from the one or more FFPI sensors before installation into the region of interest in the subsurface well to obtain a normalized spectrum; and
   f. using the normalized spectrum to calculate changes in cavity length.

2. The method of claim 1, wherein the light source is a white light source.

3. The method of claim 1, wherein the light source is a swept laser.

4. The method of claim 1, further comprising comparing the filtered reflective spectrum acquired before and after installation of the one or more FFPI sensors to estimate a wavelength dependent loss of the fiber optic cable.

5. The method of claim 1, further comprising performing a discrete Fourier-transformation on the original reflective spectrum acquired before installation of the one or more FFPI sensors to divide the signal into a low frequency region representing a background signal and a higher frequency region representing an amplitude modulated signal.

6. The method of claim 5, wherein the low-pass filter is chosen to select the background signal.

7. The method of claim 1, wherein the FFPI sensors are used to measure temperature changes.

8. The method of claim 1, wherein the FFPI sensors are used to measure pressure changes.

9. The method of claim 1, wherein the FFPI sensors are used to measure strain effects.

* * * * *